United States Patent
Ge et al.

(10) Patent No.: US 11,693,921 B2
(45) Date of Patent: Jul. 4, 2023

(54) DATA PREPARATION FOR ARTIFICIAL INTELLIGENCE MODELS

(71) Applicant: Baker Hughes Holdings LLC, Houston, TX (US)

(72) Inventors: Xiaoqing Ge, Houston, TX (US); Dustin Michael Sharber, Houston, TX (US); Jeffrey Potts, Houston, TX (US); Braden Starcher, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 256 days.

(21) Appl. No.: 17/118,566

(22) Filed: Dec. 10, 2020

(65) Prior Publication Data
US 2022/0188566 A1    Jun. 16, 2022

(51) Int. Cl.
*G06K 9/62* (2022.01)
*G06F 40/169* (2020.01)
*G06F 18/214* (2023.01)
*G06F 18/21* (2023.01)

(52) U.S. Cl.
CPC ...... *G06F 18/2148* (2023.01); *G06F 18/2178* (2023.01); *G06F 40/169* (2020.01)

(58) Field of Classification Search
CPC ... G06K 9/6257; G06K 9/6263; G06F 40/169
See application file for complete search history.

(56) References Cited

U.S. PATENT DOCUMENTS

| | | | |
|---|---|---|---|
| 2013/0262793 A1* | 10/2013 | Naethke | G06F 9/3889 711/E12.001 |
| 2019/0286939 A1* | 9/2019 | Endoh | G06K 9/6227 |
| 2021/0133553 A1* | 5/2021 | Van Den Heuvel | G06N 3/04 |
| 2021/0256761 A1* | 8/2021 | Mahdizadehaghdam | G06N 3/0472 |

* cited by examiner

*Primary Examiner* — David F Dunphy
(74) *Attorney, Agent, or Firm* — Mintz Levin Cohn Ferris Glovsky and Popeo, PC

(57) ABSTRACT

A method of data preparation for artificial intelligence models includes receiving data characterizing a first plurality of images. The method further includes annotating a first subset of images of the first plurality of images based at least in part on a first user input to generate annotated first subset of images. The annotating includes labelling one or more features of the first subset of images. The method also includes generating, by a training code, an annotation code, the training code configured to receive the annotated first subset of images as input and output the annotation code. The training and the annotation code includes computer executable instructions. The method also includes annotating, by the annotation code, a second subset of images of the first plurality of images to generate annotated second subset of images, wherein the annotating includes labelling one or more features of the second subset of images.

23 Claims, 5 Drawing Sheets

DATA PREPARATION FOR ARTIFICIAL INTELLIGENCE MODELS

BACKGROUND

Artificial Intelligence (AI) is a branch of computer science concerned with building smart machines capable of performing tasks that typically require human intelligence. An AI system can interpret and learn from external data, and achieve specific goals and tasks based on this learning through flexible adaptation. AI systems are becoming increasingly prevalent in fields such as detection systems (e.g., facial recognition), self-driving automobiles, robotics, healthcare etc.

SUMMARY

Various aspects of the disclosed subject matter may provide one or more of the following capabilities.

In one implementation, a method includes receiving data characterizing a first plurality of images. The method further includes annotating a first subset of images of the first plurality of images based at least in part on a first user input to generate annotated first subset of images. The annotating includes labelling one or more features of the first subset of images. The method also includes generating, by a training code, an annotation code, the training code configured to receive the annotated first subset of images as input and output the annotation code. The training and the annotation code includes computer executable instructions. The method also includes annotating, by the annotation code, a second subset of images of the first plurality of images to generate annotated second subset of images. The annotating includes labelling one or more features of the second subset of images.

One or more of the following features can be included in any feasible combination.

In one implementation, In one implementation, the method further includes selecting one or more images from the annotated second subset of images; providing the selected one or more images of the annotated second subset of images to a user; receiving a second user input indicative of annotation information associated with the selected one or more images; and calculating a characteristic metric associated with the selected one or more images based on the second user input. In another implementation, the method includes determining that the characteristic metric has a value within a first predetermined range of values indicative that the annotation code requires further training. The method also includes annotating the one or more images of the annotated second subset of images based on the second user input to generate a first set of user annotated images. The annotating includes labelling one or more features of the selected one or more images from the annotated second subset of images. The method further includes generating, by the training code, a revised annotation code. The training code is configured to receive the first set of user annotated images as input and output the revised annotation code.

In one implementation, the method further includes annotating, by the revised annotation code, a third subset of images of the first plurality of images to generated annotated third subset of images. The annotating includes labelling one or more features of the third subset of images. In another implementation, the method further includes selecting one or more images from the annotated third subset of images; providing the selected one or more images of the annotated third subset of images to a user; receiving a third user input indicative of annotation information associated with the selected one or more images from the annotated third subset of images; and calculating a second characteristic metric associated with the selected one or more images from the annotated third subset of images based on the third user input.

In one implementation, the method further includes determining that the second characteristic metric has a value within the first predetermined range of values indicative that the revised code requires further training. The method further includes annotating the one or more images of the annotated third subset of images based on the third user input to generate a second set of user annotated images. The annotating includes labelling one or more features of the selected one or more images from the annotated third subset of images. The method also includes generating, by the training code, a second revised annotation code. The training code is configured to receive the second set of user annotated images as input and output the second revised annotation code.

In one implementation, the method further includes determining that the second characteristic metric has a value within a second predetermined range of values indicative that the revised code does not require further training; and generating a second plurality of images. The generating includes annotating the first plurality of images by the revised annotation code. In another implementation, the method further includes calculating a quality metric associated with the second plurality of images based on a discrepancy between an image variation characteristic of the second plurality of images and predetermined training data requirements of a target deep learning code. In yet another implementation, the method further includes determining, based on the quality metric, that the second plurality of images requires image synthesis; and generating, by an image generator, a plurality of synthesized images by varying one or more characteristics of the second plurality of images based on a first set of variation settings of the image generator.

In one implementation, the method further includes discriminating the plurality of synthesized images to determine that the plurality of synthesized images qualify as real images; and generating a plurality of training images that include the plurality of synthesized images and the second plurality of images. In another implementation, the method further includes discriminating the plurality of synthesized images to determine that the plurality of synthesized images do not qualify as real images; and generating, by the image generator, a second plurality of synthesized images by varying one or more characteristics of the second plurality of images based on a second set of variation settings of the image generator.

In one implementation, the method further includes augmenting the second plurality of images. The augmenting includes determining, based on the quality metric, that the second plurality of images requires image augmentation; and generating, by an image augmenter, a plurality of augmented images by applying a transformation function on the second plurality of images. The transformation function is configured to vary one or more features of the second plurality of images. In another implementation, the method further includes comprising generating a plurality of training images that include the plurality of augmented images and the second plurality of images. In yet another implementation, the annotation information in the second user input indicative includes correction to annotations in the selected one or more images of the second subset of images and/or annotation information including labels for unlabeled features in the one or more images. In one implementation, the selecting the one or more images from the annotated second subset of images is based on predetermined criteria. The predetermined criteria includes one or more of confusion matrix, precision, recall, F1 score and Intersection over Union (IoU). In another implementation, the first plurality of images are tomography images of a battery.

In one implementation, In one implementation, a method includes receiving data characterizing a first plurality of images; and annotating a first subset of images of the first plurality of images based at least in part on a first user input to generate annotated first subset of images. The annotating includes labelling one or more features of the first subset of images; generating, by a training code, an annotation code, and the training code configured to receive the annotated first subset of images as input and output the annotation code. The method further includes iteratively annotating at least a portion of the received first plurality of images. Each iteration of the iterative annotation includes selecting a subset of images from the first plurality of images; annotating, by the annotation code, the selected subset of images; selecting one or more images from the annotated images; providing the selected one or more images to a user; receiving a second user input indicative of annotation information associated with the selected one or more images; and calculating a characteristic metric associated with the selected one or more images based on the second user input. In another implementation, the method further includes exiting a current iteration the iterative annotation when the characteristic metric has a value within a predetermined range; and generating a second plurality of images. The generating includes annotating the first plurality of images by the annotation code in a previous iteration.

In one implementation, In one implementation, a method includes receiving data characterizing a plurality of images; and calculating a quality metric associated with the plurality of images based on a discrepancy between an image variation characteristic of the plurality of images and predetermined training data requirements of a target deep learning code. The method further includes determining, based on the quality metric, that the plurality of images require image modification; and generating one or more of a plurality of synthesized images and a plurality of augmented images from the plurality of images based on the quality metric.

One or more of the following features can be included in any feasible combination.

In one implementation, In one implementation, the method further includes determining that the image modification includes a synthesis of the plurality of images; and generating, by an image generator, a plurality of synthesized images by at least varying one or more characteristics of the plurality of images based on a first set of variation settings of the image generator. In another implementation, the method further incudes discriminating the plurality of synthesized images to determine that the plurality of synthesized images qualify as real images; and generating a plurality of training images that include the plurality of synthesized images and the second plurality of images. In another implementation, the method further includes discriminating the plurality of synthesized images to determine that the plurality of synthesized images do not qualify as real images; and generating, by the image generator, a second plurality of synthesized images by varying one or more characteristics of the second plurality of images based on a second set of variation settings of the image generator. In yet another implementation, the method further includes determining that the image modification includes augmentation of the plurality of images; and generating, by an image augmenter, a plurality of augmented images by at least applying a transformation function on the second plurality of images. The transformation function is configured to vary one or more features of the second plurality of images.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Artificial intelligence (AI) models (e.g., machine learning models, deep-learning models, etc.) can be trained to mimic cognitive abilities of humans. For example, AI models can identify and quantify features in an image (e.g., identify defects in an image of an industrial system). The accuracy of the AI models can be improved by improving the quality and/or quantity of training data (e.g., training images) used to train the AI model. The quality of training data can be improved by accurately labeling the training data (e.g., labeling features of training images). Manually labeling training data can be inefficient, labor-intensive and prone to errors. Moreover, outsourcing the labelling of training data to an outside party may not be desirable (e.g., when the training data is confidential, domain knowledge from end users is required to annotate the data, etc.). Some implementations of current subject matter can provide systems and methods for AI based annotation and/or generation of training data that can efficiently leverage user feedback to accelerate labelling of training data.

Figure 1:
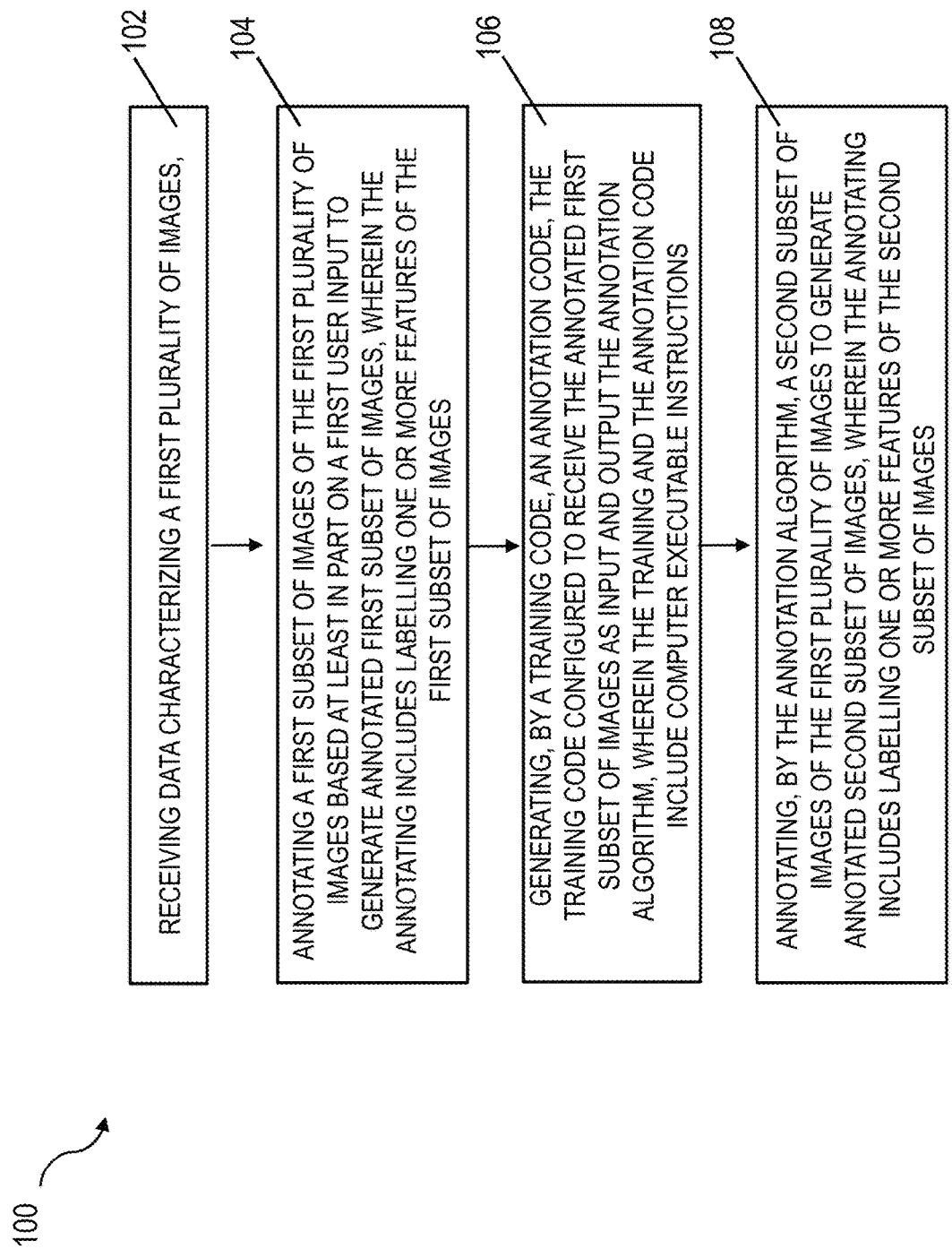
FIG. 1 is a flow chart of an exemplary method for annotating images.
Figure 2:
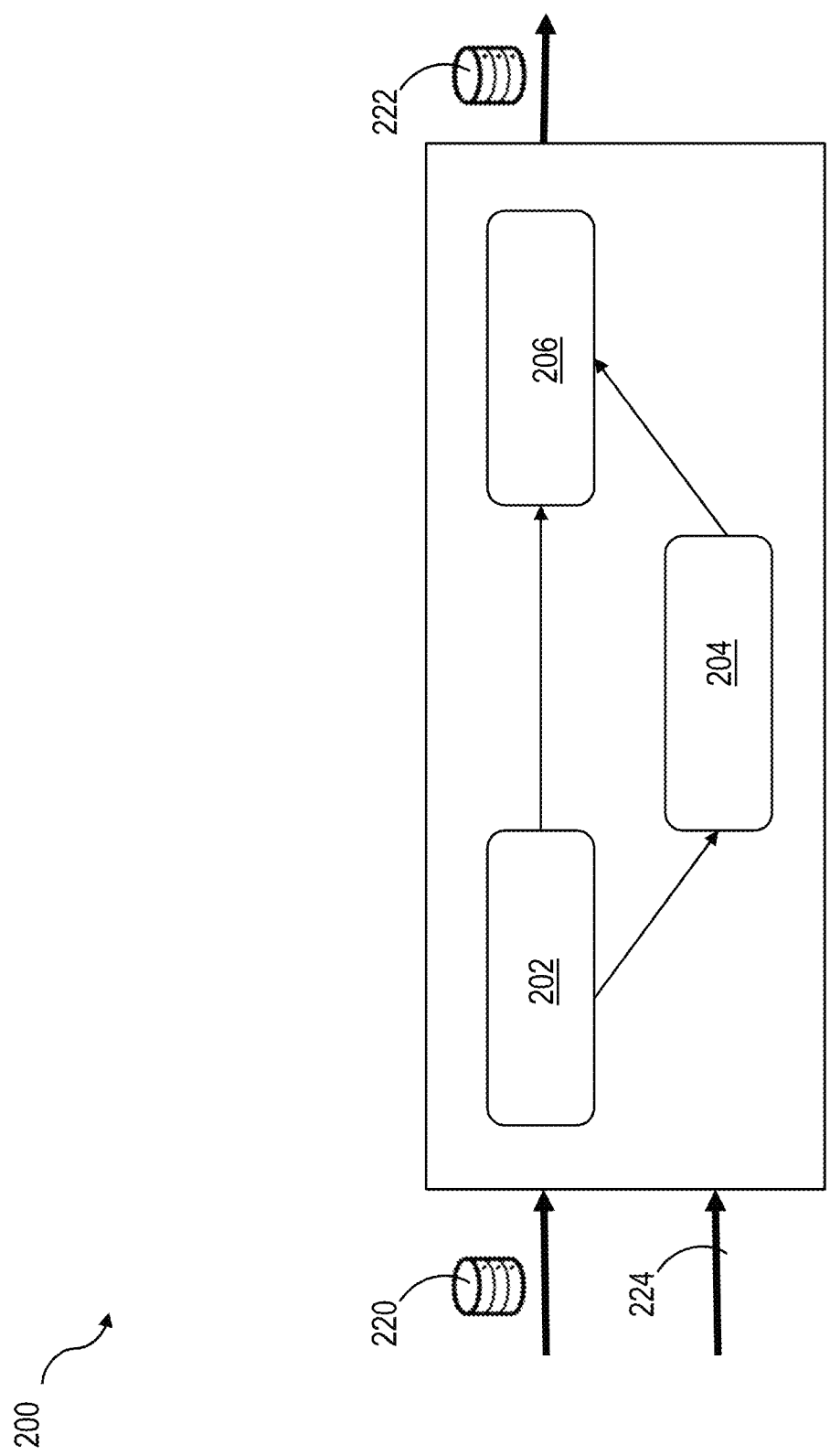
FIG. 2 is a schematic illustration of an exemplary data preparation system.

FIG. 1 is a flow chart of an exemplary method for annotating images by a data preparation system. At step 102, data characterizing a first plurality of images can be received by a data preparation system that can be configured to annotate the first plurality of images. FIG. 2 is a schematic illustration of an exemplary data preparation system 200 that includes a data organization system 202, a data annotation system 204 and a data generation system 206. In some implementations, the data organization system 202 can receive the first plurality of images 220 and modify the first plurality of images that can be received by the data annotation system 204 and/or data generation system 206. For example, the data organization system 202 can include filters that can remove undesirable image properties from the first plurality of images. Additionally or alternately, it can convert the received images to a desirable format (e.g., a predetermined format suitable for the data annotation system 204 and/or data generation system 206). In some implementations, the data preparation system 200 may not include the data organization system 202 and the received first plurality of images can be received by the data annotation system 204.

Figure 3:
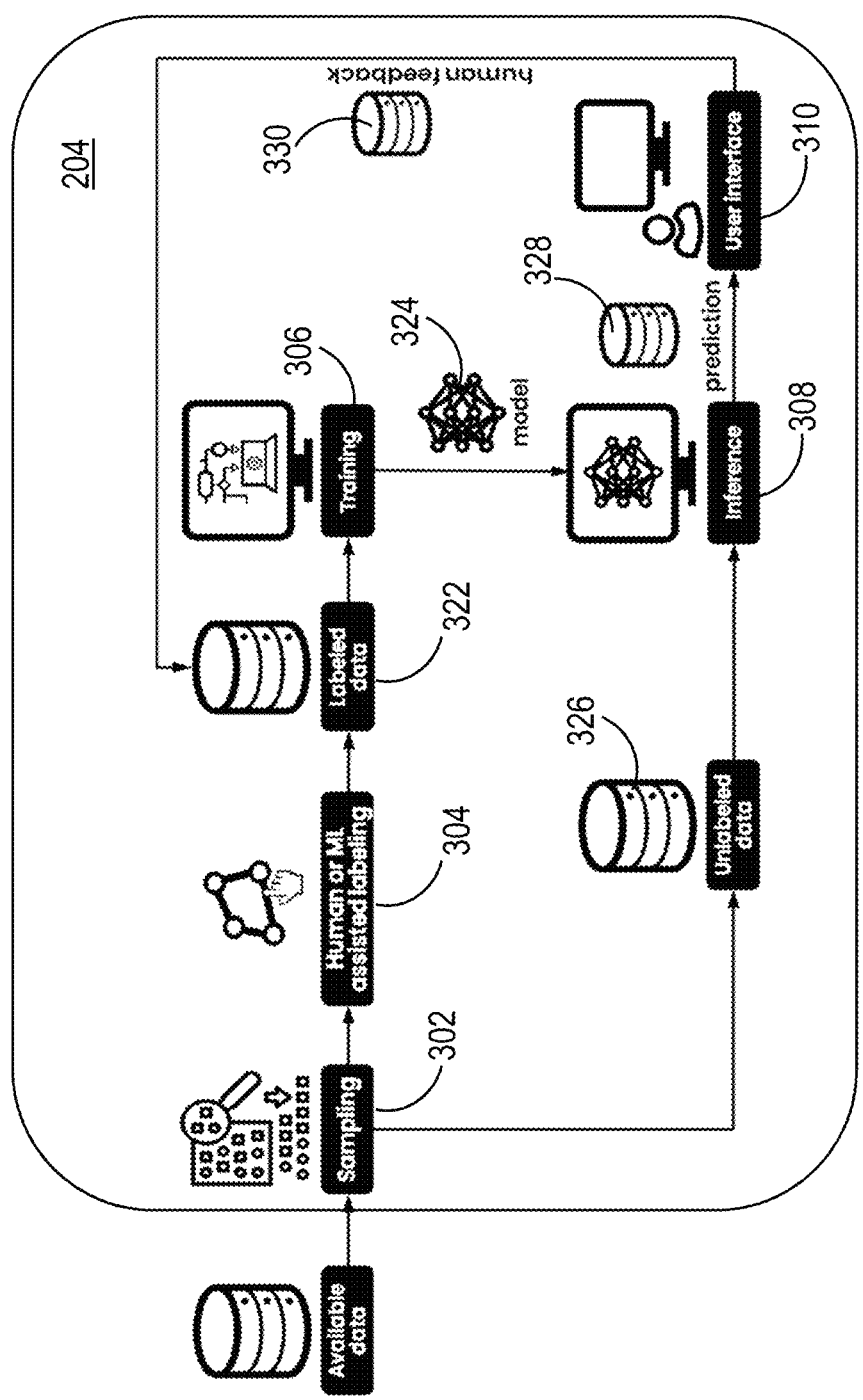
FIG. 3 illustrates an exemplary implementation of a data annotation system in the data preparation system in FIG. 2.

Returning to FIG. 1, at step 104, a first subset of images of the first plurality of images can be annotated. FIG. 3 illustrates an exemplary implementation of the data annotation system 204. The data annotation system 204 can include a sampling algorithm 302 that can receive the first plurality of images (e.g., that have been modified by the data organization system 202) and select the first subset of images (e.g., based on random selection). The selected first subset of images can be received by a first annotation algorithm 304 that can annotate one or more features of the selected first subset of images. In some implementation, the first annotation algorithm 304 can present the first subset of images to a human user(s) who can annotate one or more features of the first subset of images (e.g., label one or more features in the first subset of images).

In one implementation, the first plurality of images can be images of an industrial site (e.g., an industrial device, a battery at the industrial site, etc.). The human user can be provided with the first subset of images of the first plurality of images (e.g., via a graphical user interface (GUI) display space) and he/she can identify characteristics of the industrial site (e.g., defects in image of the industrial devices, tomography scan of batteries, etc.). The selected first subset of images can be modified based on the user input to generate annotated images 322 (or annotated first subset of images). Various characteristics (e.g., defects) of the annotated images 322 can be labelled based on the user input.

At step 106 a training algorithm 306 can be configured to receive the annotated images 322 as input and generate an annotation algorithm 324 as an output. The annotation algorithm 324 can include an AI computer vision model that can predict annotations (bounding boxes, polygons, etc.). In some implementations, the training algorithm 306 can train the AI computer vision model (e.g., by changing one or more coefficients in the computer vision model) based on the annotated images 322. The sampling algorithm 302 can select a second subset of images (e.g., based on random selection). The selected second subset of images can be received by the annotation algorithm 324 generated by the training algorithm 306.

At step 108, the annotation algorithm 324 can annotate the second subset of images (e.g., by labelling one or more features/defects in the second subset of images) to generate second annotated images 328 (or annotated second subset of images). The annotation can include, for example, adding labels to one or more features of the second subset of images. The labels can identify the features (e.g., names of the features/defects]) and/or describe properties of the feature (e.g., size of the feature, priority level associated with the feature, etc.). One or more images can be selected (e.g., randomly selected) from the annotated images 328. The selection of one or more images can be based on one or more predetermined criteria (e.g., confusion matrix, precision, recall, F1 score and Intersection over Union, etc.). The selected one or more images of the annotated images 328 can be provided to a user (e.g., a human) for inspection. This can be done, for example, through a graphical user interface. The user can review the annotations of the selected images and provide a user input indicative of annotation information associated with the selected one or more images. For example, the user can check the annotations for accuracy. If the selected images have been inaccurately annotated by the annotation algorithm 324, the user can provide corrections to the existing annotations (e.g., by relabeling features in the selected images via the user input). Additionally or alternately, the user can label unlabeled features in the selected images.

Based on the user input, a characteristic metric associated with the selected one or more images can be calculated. The characteristic metric can be indicative of the performance of the annotation algorithm 324. The characteristic metric can be related to number of corrections that the user made to the annotations and/or number of new labels that the user has provided via the user input. Additionally or alternatively, the characteristic metric can be related to the quality of the feature that was not labelled/erroneously labelled by the annotation algorithm 324. For example, the user may have to provide/correct a label of a predetermined feature (e.g., a defect). The predetermined feature may have a high priority for being identified by the annotation algorithm 324 (e.g., the predetermined feature can be a defect critical for the operation of the industrial device/battery). Based on the value of the characteristic metric, the data annotation system 204 can determine that the annotation algorithm 324 needs further training (e.g. when the characteristic metric has a value within a first predetermined range) or that the annotation algorithm 324 is sufficiently trained and does not require further training (e.g. when the characteristic metric has a value within a second predetermined range). In some implementations, a threshold value of the characteristic metric can determine whether the annotation algorithm 324 needs further training or not (e.g., characteristic metric higher than or equal to the threshold value will lead to further training and characteristic metric lower than the threshold value prevent further training).

If the characteristic metric is in the first predetermined range, the selected one or more images from the second annotated images 328 may be further annotated based on the user input (e.g., annotations by the annotation algorithm corrected, new labels added, etc.) to generate user annotated images 330 (or first set of user annotated images). The first set of user annotated images 330 can be received by the training algorithm 306. The training algorithm 306 can generate an annotation algorithm 324 (revised annotation algorithm) based on the first set of user annotated images 330 and optionally the annotated images 322.

The sampling algorithm 302 can select a third subset of images (e.g., based on random selection). The third subset of images can be received by the revised annotation algorithm 324 that can annotate the third subset of images (e.g., by labelling one or more features/defects in the third subset of images) to generate annotated images 328 (annotated third subset of images). One or more images can be selected (e.g., randomly selected) from the annotated third annotated images 328. The selected one or more images of the third annotated images 328 can be provided to a user (e.g., a human) for inspection. This can be done, for example, through the graphical user interface. The user can review the annotations of the selected images and provide a user input indicative of annotation information associated with the selected one or more images (e.g., corrections to the existing annotations, adding labels to unlabeled features, etc.). A revised characteristic metric can be calculated based on which determination of retraining the revised annotation algorithm 324 can be made (e.g., by generating revised user annotated images 330 that are then received by the training algorithm 306 to generate a new annotating algorithm 324).

In some implementations, the annotation can be iteratively revised until the characteristic metric has a value in the second predetermined range. In each iteration, the sampling algorithm can select a subset of images; annotate the selected images using the current annotation algorithm to generate annotated images; select one or more images from the annotated images; provide the selected one or more images to a user; generate user annotated images based on user input by annotating the selected one or more images from the annotated images; calculate a characteristic metric; determine that the characteristic metric is in the first predetermined range; and generate a revised annotation algorithm by the training algorithm 306 based in part on the user annotated images. If the value of the characteristic metric falls in the second predetermined range, the iterative annotation can be exited. For example, the current iteration (e.g., $i^{th}$ iteration) can be stopped and the annotation algorithm generated in the previous iteration (e.g., $[i-1]^{th}$ iteration) can be used to annotate the first plurality of images (or a portion thereof) received at step 102 of FIG. 2 to generate a second plurality of images. In each iteration a new/revised annotating algorithm can be generated based on input from the user. This can result in an improved annotation algorithm for accurately annotating the first plurality of images. Additionally or alternatively, the time taken to generate a desirable annotation algorithm can be reduced.

Figure 4:
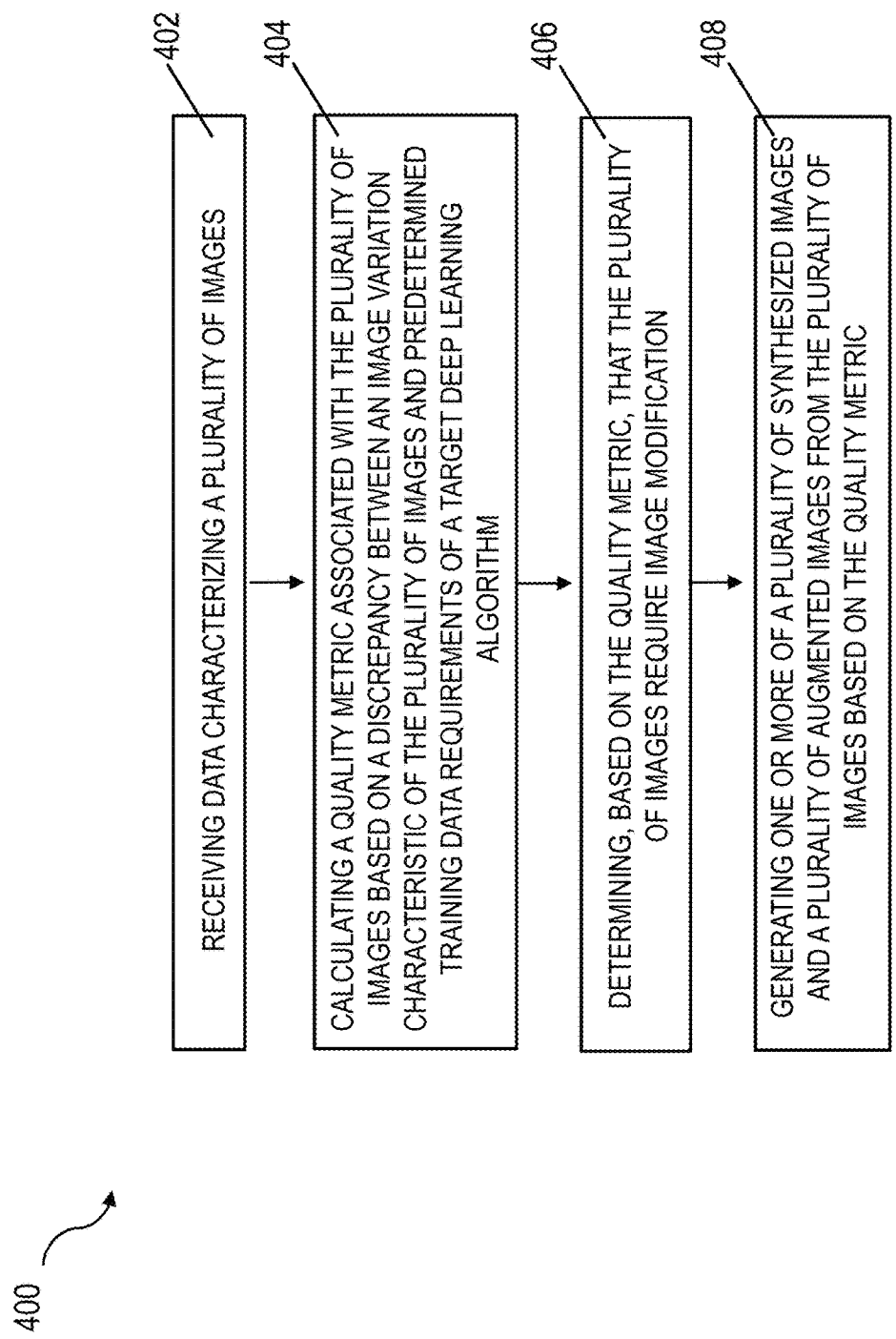
FIG. 4 is a flow chart of an exemplary method for generating images.

In addition to accuracy in the annotation of images, it can be desirable to have variation in the characteristics (e.g., variation in the number/types of features) of the training images. For example, the training images can be limited and/or the training images may not have desirable variation in characteristics for accurate training of the AI model. This can be case when the training data is hard to collect (e.g., due to data sensitivity, data scarcity, etc.). FIG. 4 is a flow chart of an exemplary method for generating images by the data generation system 206. At step 402, the data generation system 206 can receive data characterizing a plurality of images. As illustrated in FIG. 2, the data generation system 206 can received images from the data annotation system 204 (e.g., second plurality of annotated images that are the output of the data annotation system 204) and/or images from the data organization system 202 (e.g., first plurality of images that have been modified by data organization system 202 as described above). In some implementations, the data generation system 206 can directly receive the first plurality of images (e.g., inspection images from an industrial site).

Figure 5:
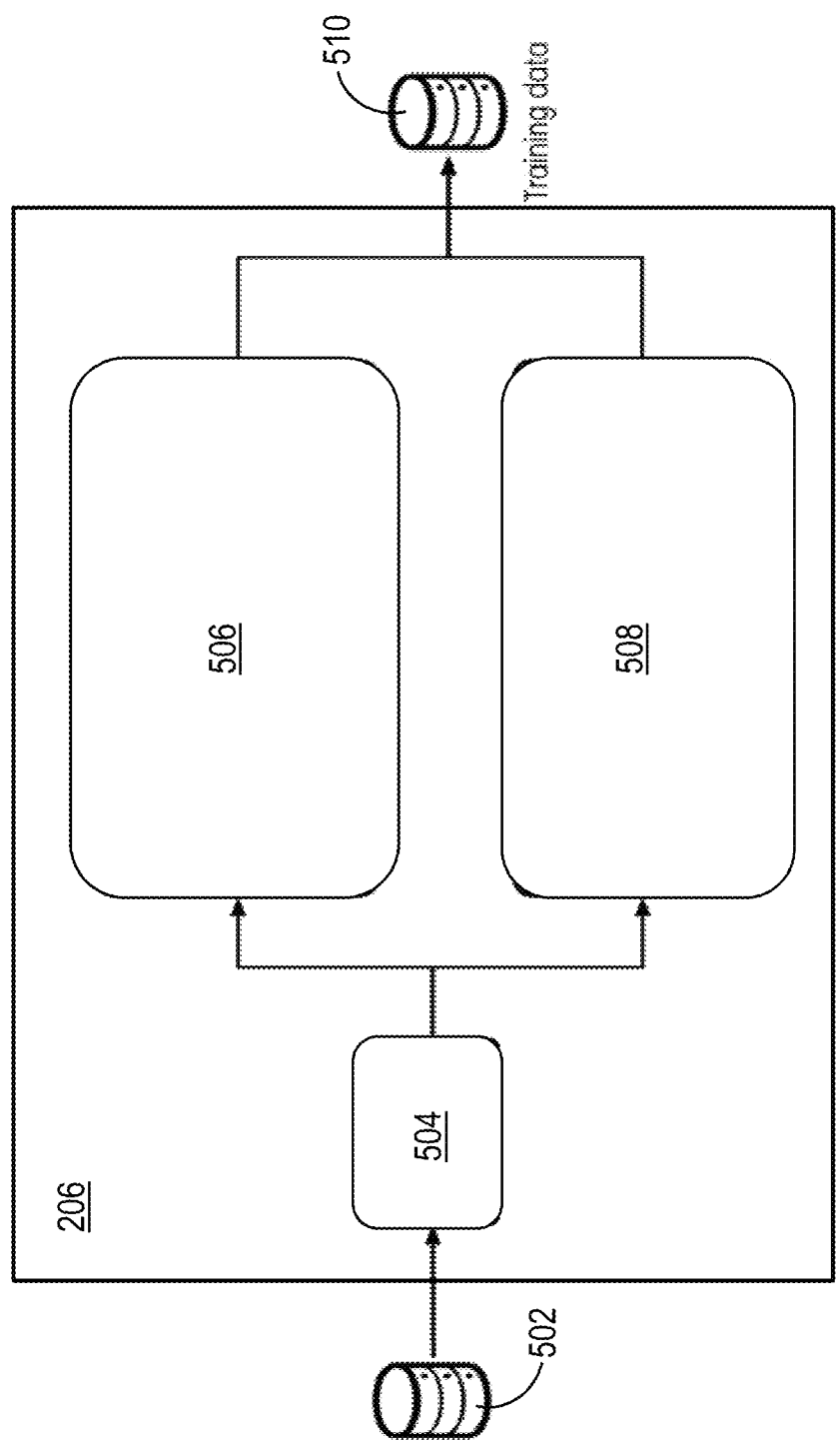
FIG. 5 illustrates an exemplary implementation of a data generation system in the data preparation system in FIG. 2.

FIG. 5 illustrates an exemplary implementation of the data generation system 206 that includes a gap analysis algorithm 504, a data synthesizer algorithm 506 and a data augmentation algorithm 508. The gap analysis algorithm 504 can receive the data characterizing the plurality of images 502 received by the data generation system 206 at step 402. At step 404, a quality metric associated with one or more of the plurality of images received at step 402 can be calculated by the gap analysis algorithm 504. In one implementation, the quality metric can be calculated based on a comparison (or a discrepancy) between an image variation characteristic of the images received at step 402 and a predetermined training data requirements of a target AI model (e.g., deep learning algorithm). The image variation characteristic can be indicative of variation in the characteristics (e.g., defects) in the received images. For example, the image variation characteristic can be proportional to the number/type of features (e.g., defects in an industrial device, battery, etc.) in the received images. The predetermined training data requirement can be a function of the target AI model that will receive and train on the training data generated by the data generation system 206. For example, the predetermined training data requirement can be indicative of the number/types of defects that are desirable for robustness and/or accuracy of the target AI model. In some implementations, the image variation characteristics can include brightness, contrast, signal to noise ratio, rotation, etc. In some implementations, the predetermined training data requirements can include specifications on those variations. In some implementations, quality metrics can include a predetermined number of training images needed for training the AI model, the difference between existing dataset and predefined training data requirements, etc.

At step 406, determination can be made that the received images lack desirable characteristic variation and that image modification is recommended (e.g., image augmentation, image synthesis, etc.). The quality metric can be indicative of variety of the features (e.g., variety in size, attributes, distribution, etc., of the features) in the received images. For example, the quality metric can indicate that received images do not have sufficient variations in their characteristics and new training images that mimic the characteristic variation distribution of real-world images need to be synthesized via image synthesis. Additionally or alternatively, the quality metric can indicate that the features of the received images do not have sufficient variations in their characteristics and the features of the received images need to be augmented via image augmentation. In some implementations, data augmentation can be performed as a first step followed by data synthesis (e.g., if the quality metrics requirements are not met after data augmentation).

At step 408, one or more of a plurality of synthesized images and a plurality of augmented images can be generated from the images received at step 402. For example, the gap analysis algorithm 504 can determine that the image modification includes image synthesis (e.g., based on the quality metric) and at least a portion of the received images can be directed to the data synthesizer algorithm 506. Additionally or alternatively, the gap analysis algorithm 504 can determine that the image modification includes image augmentation and at least a portion of the received images can be directed to the data augmentation algorithm 508.

The data synthesizer algorithm 506 can include AI algorithms such as Generative Adversarial Networks (GANs) or Variational AutoEncoders (VAEs). In one implementation, the data synthesizer algorithm 506 can include an image generator and an image discriminator. The image generator can receive one or more of the received images and output a plurality of synthesized images. The image generator can vary one or more of the characteristics of the received image(s) based on a first set of variation settings of the image generator. The first set of variation settings can be indicative of a first distribution of characteristics of the target object (e.g., industrial device, battery, etc.) whose image is received by the data generation system 206.

The image discriminator can receive the plurality of synthesized image and determine (or discriminate) whether they qualify as real images. This can be done, for example, by calculating an evaluation score for each of the synthesized images. The evaluation score may be indicative of variation in number/type of characteristics in the synthesized images (e.g., defects in tomography images of batteries). If the evaluation score is above a threshold value (e.g., indicative of real-world image characteristic variation), the synthesized images can qualify as real-world images and the output of the data generation system 206 can include the synthesized images.

If the evaluation score is below the threshold value, the synthesized images may not qualify as real-world images and the image generator can generate a second plurality of synthesized images (e.g., by varying one or more of the characteristics of the received image(s) based on a second set of variation settings of the image generator). The image discriminator can determine whether the second plurality of synthesized images qualify as real-world images by calculating a second evaluation score and by comparing it with the threshold value. This iterative process can be repeated until the evaluation score calculated in the latest iteration is above the threshold value. When this condition is fulfilled, the synthesized images of the latest iteration are included in the output of the data generation system 206.

The gap analysis algorithm 504 can determine that the image modification includes image augmentation and at least a portion of the received images can be directed to the data augmentation algorithm 508. The data augmentation algorithm 508 can include an image augmenter that can augment the images received by the augmentation algorithm by applying a transformation function on one or more features of the images. For example, the transformation function can transform the shape/size of features (e.g., defects) in the images and output a plurality of augmented images. The output of the data generation system 206 can include the augmented images.

The data preparation system 200 can output training data 222 that can be used to train an AI model (e.g., a deep learning model). The training data can include one or more of outputs of the data annotation system 204 and the data generation system 206 (e.g., the data synthesizer algorithm 506, the data augmentation algorithm 508, etc.). The trained AI model can perform inference (e.g., identify defects) on images (e.g., tomography images) from an industrial site (e.g., industrial devices, batteries, etc.). The performance of the trained AI model can be monitored (e.g., by a human user, a computing device, etc.). If the human user is not satisfied with the performance of the AI model, he/she can provide instructions 224 to generate new training data. Upon receiving instruction 224, the data preparation system can generate new training data (e.g., by annotating images as described in FIG. 1 and/or generating images as described in FIG. 4).

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments are described herein to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. An algorithm can include a computer program. An algorithm can include computer executable instructions (e.g. that can be executed by a processor).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving data characterizing a first plurality of images;
   annotating a first subset of images of the first plurality of images based at least in part on a first user input to generate annotated first subset of images, wherein the annotating comprises labelling one or more features of the first subset of images;
   generating, by a training code, an annotation code, the training code configured to receive the annotated first subset of images as input and output the annotation code, wherein the training code and the annotation code comprises computer executable instructions;
   annotating, by the annotation code, a second subset of images of the first plurality of images to generate annotated second subset of images, wherein the annotating comprises labelling one or more features of the second subset of images;
   selecting one or more images from the annotated second subset of images based on predetermined criteria, wherein the predetermined criteria comprises one or more of confusion matrix, precision, recall, F1 score and Intersection over Union (IoU);
   providing the selected one or more images of the annotated second subset of images to a user;
   receiving a second user input indicative of annotation information associated with the selected one or more images; and
   calculating a characteristic metric associated with the selected one or more images based on the second user input.

2. The method of claim 1, further comprising:
   determining that the characteristic metric has a value within a first predetermined range of values indicative that the annotation code requires further training;
   annotating the one or more images of the annotated second subset of images based on the second user input to generate a first set of user annotated images, wherein the annotating comprises labelling one or more features of the selected one or more images from the annotated second subset of images; and
   generating, by the training code, a revised annotation code, wherein the training code is configured to receive the first set of user annotated images as input and output the revised annotation code.

3. The method of claim 2, further comprising annotating, by the revised annotation code, a third subset of images of the first plurality of images to generate an annotated third subset of images, wherein the annotating comprises labelling one or more features of the third subset of images.

4. The method of claim 3, further comprising:
   selecting one or more images from the annotated third subset of images;
   providing the selected one or more images of the annotated third subset of images to a user;
   receiving a third user input indicative of annotation information associated with the selected one or more images from the annotated third subset of images; and calculating a second characteristic metric associated with the selected one or more images from the annotated third subset of images based on the third user input.

5. The method of claim 4, further comprising:
determining that the second characteristic metric has a value within the first predetermined range of values indicative that the revised code requires further training;
annotating the one or more images of the annotated third subset of images based on the third user input to generate a second set of user annotated images, wherein the annotating comprises labelling one or more features of the selected one or more images from the annotated third subset of images; and
generating, by the training code, a second revised annotation code, wherein the training code is configured to receive the second set of user annotated images as input and output the second revised annotation code.

6. The method of claim 4, further comprising:
determining that the second characteristic metric has a value within a second predetermined range of values indicative that the revised code does not require further training; and
generating a second plurality of images, wherein the generating comprises annotating the first plurality of images by the revised annotation code.

7. The method of claim 6, further comprising calculating a quality metric associated with the second plurality of images based on a discrepancy between an image variation characteristic of the second plurality of images and predetermined training data requirements of a target deep learning code.

8. The method of claim 7, further comprising:
determining, based on the quality metric, that the second plurality of images requires image synthesis; and
generating, by an image generator, a plurality of synthesized images by varying one or more characteristics of the second plurality of images based on a first set of variation settings of the image generator.

9. The method of claim 8, further comprising:
discriminating the plurality of synthesized images to determine that the plurality of synthesized images qualify as real images; and
generating a plurality of training images that include the plurality of synthesized images and the second plurality of images.

10. The method of claim 8, further comprising:
discriminating the plurality of synthesized images to determine that the plurality of synthesized images do not qualify as real images; and
generating, by the image generator, a second plurality of synthesized images by varying one or more characteristics of the second plurality of images based on a second set of variation settings of the image generator.

11. The method of claim 10, further comprising generating a plurality of training images that comprise the plurality of augmented images and the second plurality of images.

12. The method of claim 7, further comprising augmenting the second plurality of images, the augmenting including:
determining, based on the quality metric, that the second plurality of images requires image augmentation; and
generating, by an image augmenter, a plurality of augmented images by applying a transformation function on the second plurality of images, wherein the transformation function is configured to vary one or more features of the second plurality of images.

13. The method of claim 4, wherein the annotation information in the second user input indicative comprises correction to annotations in the selected one or more images of the second subset of images and/or annotation information including labels for unlabeled features in the one or more images.

14. The method of claim 1, wherein the first plurality of images are tomography images of a battery.

15. A method comprising:
receiving data characterizing a first plurality of images;
annotating a first subset of images of the first plurality of images based at least in part on a first user input to generate annotated first subset of images, wherein the annotating comprises labelling one or more features of the first subset of images;
generating, by a training code, an annotation code, the training code configured to receive the annotated first subset of images as input and output the annotation code; and
iteratively annotating at least a portion of the received first plurality of images, wherein each iteration of an iterative annotation comprises:
selecting a subset of images from the first plurality of images,
annotating, by the annotation code, the selected subset of images as annotated images;
selecting one or more images from the annotated images based on predetermined criteria, wherein the predetermined criteria comprises one or more of confusion matrix, precision, recall, F1 score and Intersection over Union (IoU);
providing the selected one or more images to a user;
receiving a second user input indicative of annotation information associated with the selected one or more images; and
calculating a characteristic metric associated with the selected one or more images based on the second user input.

16. The method of claim 15, further comprising:
exiting a current iteration an iterative annotation when the characteristic metric has a value within a predetermined range; and
generating a second plurality of images, wherein the generating comprises annotating the first plurality of images by the annotation code in a previous iteration.

17. A method comprising:
receiving data characterizing a plurality of images;
calculating a quality metric associated with the plurality of images based on a discrepancy between an image variation characteristic of the plurality of images and predetermined training data requirements of a target deep learning code;
determining, based on the quality metric, that the plurality of images require image modification;
generating first plurality of images comprising one or more of a plurality of synthesized images and a plurality of augmented images from the plurality of images based on the quality metric;
annotating a first subset of images of the first plurality of images based at least in part on a first user input to generate annotated first subset of images, wherein the annotating comprises labelling one or more features of the first subset of images;
generating, by a training code, an annotation code, the training code configured to receive the annotated first subset of images as input and output the annotation code, wherein the training code and the annotation code comprises computer executable instructions;

annotating, by the annotation code, a second subset of images of the first plurality of images to generate annotated second subset of images, wherein the annotating comprises labelling one or more features of the second subset of images;

selecting one or more images from the annotated second subset of images based on predetermined criteria, wherein the predetermined criteria comprises one or more of confusion matrix, precision, recall, F1 score and Intersection over Union (IoU);

providing the selected one or more images of the annotated second subset of images to a user;

receiving a second user input indicative of annotation information associated with the selected one or more images; and calculating a characteristic metric associated with the selected one or more images based on the second user input.

18. The method of claim 17, further comprising determining that the image modification comprises a synthesis of the plurality of images; and generating, by an image generator, a second plurality of images by at least varying one or more characteristics of the plurality of images based on a first set of variation settings of the image generator.

19. The method of claim 18, further comprising:
discriminating the plurality of synthesized images to determine that the plurality of synthesized images qualify as real images; and
generating a plurality of training images that comprise the plurality of synthesized images and the second plurality of images.

20. The method of claim 18, further comprising:
discriminating the plurality of synthesized images to determine that the plurality of synthesized images do not qualify as real images; and
generating, by the image generator, a second plurality of synthesized images by varying one or more characteristics of the second plurality of images based on a second set of variation settings of the image generator.

21. The method of claim 17, further comprising:
determining that the image modification comprises augmentation of the plurality of images; and
generating, by an image augmenter, a plurality of augmented images by at least applying a transformation function on the second plurality of images, wherein the transformation function is configured to vary one or more features of the second plurality of images.

22. A system comprising:
at least one data processor;
memory coupled to the at least one data processor, the memory storing instructions to cause the at least one data processor to perform operations comprising:
receiving data characterizing a first plurality of images;
annotating a first subset of images of the first plurality of images based at least in part on a first user input to generate annotated first subset of images, wherein the annotating comprises labelling one or more features of the first subset of images;

generating, by a training code, an annotation code, the training code configured to receive the annotated first subset of images as input and output the annotation code, wherein the training code and the annotation code comprises computer executable instructions;

annotating, by the annotation code, a second subset of images of the first plurality of images to generate annotated second subset of images, wherein the annotating comprises labelling one or more features of the second subset of images;

selecting one or more images from the annotated second subset of images based on predetermined criteria, wherein the predetermined criteria comprises one or more of confusion matrix, precision, recall, F1 score and Intersection over Union (IoU);

providing the selected one or more images of the annotated second subset of images to a user;

receiving a second user input indicative of annotation information associated with the selected one or more images; and calculating a characteristic metric associated with the selected one or more images based on the second user input.

23. A computer program product comprising a non-transitory machine-readable medium storing instructions that, when executed by at least one programmable processor that comprises at least one physical core and a plurality of logical cores, cause the at least one programmable processor to perform operations comprising:

receiving data characterizing a first plurality of images;

annotating a first subset of images of the first plurality of images based at least in part on a first user input to generate annotated first subset of images, wherein the annotating comprises labelling one or more features of the first subset of images;

generating, by a training code, an annotation code, the training code configured to receive the annotated first subset of images as input and output the annotation code, wherein the training code and the annotation code comprises computer executable instructions;

annotating, by the annotation code, a second subset of images of the first plurality of images to generate annotated second subset of images, wherein the annotating comprises labelling one or more features of the second subset of images;

selecting one or more images from the annotated second subset of images based on predetermined criteria, wherein the predetermined criteria comprises one or more of confusion matrix, precision, recall, F1 score and Intersection over Union (IoU);

providing the selected one or more images of the annotated second subset of images to a user;

receiving a second user input indicative of annotation information associated with the selected one or more images; and calculating a characteristic metric associated with the selected one or more images based on the second user input.

* * * * *